United States Patent [19]
Schmager

[11] Patent Number: 5,762,450
[45] Date of Patent: *Jun. 9, 1998

[54] SYSTEM AND METHOD FOR RELINING SEWER PIPE SECTIONS WITH INSPECTION CAPABILITY

[75] Inventor: Klaus-Dieter Schmager, Winterscheid, Germany

[73] Assignee: HT Troplast AG, Triosdorf, Germany

[*] Notice: The term of this patent shall not extend beyond the expiration date of Pat. No. 5,725,328.

[21] Appl. No.: 331,505

[22] PCT Filed: Apr. 21, 1993

[86] PCT No.: PCT/EP93/00973

§ 371 Date: Oct. 20, 1994

§ 102(e) Date: Oct. 20, 1994

[87] PCT Pub. No.: WO93/21398

PCT Pub. Date: Oct. 28, 1993

[30] Foreign Application Priority Data

Apr. 21, 1992 [DE] Germany ............... 42 13 068.9

[51] Int. Cl.⁶ ............... E03F 3/06; F16L 55/165
[52] U.S. Cl. ............... 405/154; 138/97; 405/155
[58] Field of Search ............... 405/146, 154, 405/155, 156, 287, 294; 138/97

[56] References Cited

U.S. PATENT DOCUMENTS

| | | | |
|---|---|---|---|
| 5,167,258 | 12/1992 | Rice | 405/154 X |
| 5,305,798 | 4/1994 | Driver | 405/154 X |
| 5,395,472 | 3/1995 | Mandich | 138/97 X |

FOREIGN PATENT DOCUMENTS

| | | |
|---|---|---|
| 60134 | 9/1982 | European Pat. Off. |
| 9012003.5 | 11/1990 | Germany |
| 9110862 | 7/1991 | WIPO |

OTHER PUBLICATIONS

Abstract of DE 34 13 294 (undated).
Abstract of DE 27 04 438 (undated).
Abstract of DE 39 30 984 (undated).
Abstract of DE 39 34 980 (undated).
Abstract of DE 23 62 784 (undated).
Abstract of EP 260,341 (undated).

*Primary Examiner*—David J. Bagnell
*Attorney, Agent, or Firm*—Millen, White, Zelano, & Branigan, P.C.

[57] ABSTRACT

A system and process for relining conveyor lines like pipelines (1) with an internal inliner (2) and an external inliner (preliner 7), whereby the internal inliner (2) forms a stiffened internal pipe (30) after insertion into the external inliner (preliner 7) and the external inliner (preliner 7) is arranged at such a distance from the internal inliner (2) that an open flow section is formed between the internal and external inliners as an inspection chamber to detect and, where necessary, remedy leaks in one of the inliners, alternatively, a system and process with an internal inliner (2), a central inliner (3) and an external inliner (preliner 7) whereby the internal inliner (2) or the latter together with the central inliner (3) form a stiffened internal pipe (38) after insertion in the external inliner and whereby the external inliner (preliner 7) is arranged at such a distance from the central inliner (3) that an open flow cross-section between the central and external in liners is formed as an inspection chamber (9) to detect and, where necessary, remedy leaks in one of the inliners.

21 Claims, 5 Drawing Sheets

SYSTEM AND METHOD FOR RELINING SEWER PIPE SECTIONS WITH INSPECTION CAPABILITY

TECHNICAL FIELD

The invention relates to a system and a method for relining transport lines such as sewer pipelines or sections thereof, with an inspection capability.

Relining is a method of refurbishing damaged transport lines, generally laid underground, by inserting a new interior pipe train or similar construction into the damaged existing line.

BACKGROUND ART

In a known relining method, a long train of weld-connected plastic pipes such as polyethylene is pushed into the damaged sewer section. Since the pipes are generally inflexible, large excavations are required for this procedure.

In so-called short-pipe relining, short plastic pipes with a length of about 0.5 to at most 1 m are joined together in standard existing manholes and, from this existing manhole, pushed or pulled into the sewer section being refurbished (DE-A 34 13 294).

It has been proposed (DE-A 27 04 438) to refurbish sewer pipes by inserting into the interior of the drain pipe a flexible pipeline whose outside diameter is smaller than the inside diameter of the drain pipe, whereby the flexible pipeline is positioned at a distance from the drain pipe to form a annular space. In this method, this annular space is completely filled with a hardenable, low-viscosity fill mass, such as magnesium cement.

In DE-A1 39 30 984, a method is proposed in which a soft-PVC flexible lining (inliner) is employed with a strong-threaded random-structure fiber outer layer of polyamide serving as a spacer. A rapid-hardening mortar (so-called insulator) is inserted into the annular space formed via the random-structure fiber layer between the sewer pipe being refurbished and the inliner itself and allowed to harden. A similar method is proposed in DE-A1 39 34 980, whereby HDPE (high density polyethylene) is one suggested material for the inliner.

In "Sonderdruck aus bbr 5/90; U-Liners; Protokoll einer Sanierung. Imbema Rohrsanierungs GmbH," a method of relining sewage channels is described in which a continuous rigid HDPE pipe is folded at high temperature during manufacture into a U-shaped cross-section and this deformed cross-section is secured with straps. This structure, which is still quite rigid, is then pulled into the sewer and steam-heated under elevated pressure (about 1.3 bar) to the thermoplastic state, in which the HDPE pipe reverts to its original round cross-section.

Finally, in DE-U 90 12 003, WO 91/10862, and the company brochure "Steuler Umwelttechnik, Bekaplast für Kanalrohre, 1989," a nubbed sealing sheet for relining sewage pipes is disclosed. This rigid HDPE inliner, however, can be used only for subsequent refurbishment of passable sewer pipes of large diameter.

DE-C 23 62 784 discloses a system in which a flexible fleece tube, plastic-coated on one side, is first saturated with resin and hardener such that the tube, after insertion by the inversion method into the pipeline being refurbished and after being pressed against the pipe wall by water pressure, hardens when heat is applied to the system, thus forming a new line system with a rigid pipe wall. Since the resin/hardener system in the carrier fleece has only a limited processing time (pot time), the saturation process, transportation to the site (in a refrigerated vehicle, if necessary), and insertion must occur within a relatively short time period. For refurbishing an entire pipe train, this system with resin-impregnated fleece is an adaptable solution.

This method, however, can be used satisfactorily only for refurbishing pipes without relatively large cracks or pits, since these could allow the resin to escape before hardening or since the new flow channel would otherwise exhibit unacceptably high unevenness. In a similar method (EP-A1 0 260 341), this disadvantage is avoided by first pulling an outer resin-impregnated flexible fleece tube into the pipe being refurbished, after which an inner flexible calibration tube, also resin-impregnated, is inserted by the inversion method into the outer fleece tube. Hardening of the resin results in a rigid new pipe that is no longer connected to the old pipe being refurbished. The use of two resin-impregnated fleece tubes, however, makes this method very difficult and expensive.

Despite the many proposed solutions for relining defective sewer pipes, there has up to now been no convincing system and method that permit easy inspectability of the refurbishment process and the inliner.

OBJECT

The object of the invention is to provide a system and method which fulfill these requirements.

DISCLOSURE OF INVENTION

The invention meets this objective through a system for re-lining transport lines and a method preferably in conjunction with one or more of the described preferred embodiments.

If the entire system consists of a total of two inliners, either the inside of the outer inliner (preliner) or the outside of the inner inliner has spacers which can take the form of, for example, ribs or a strong-threaded random-structure fiber layer in accordance with DE-A1 39 30 984. However, the spacers are preferably formed by a plurality of nubs, which are preferably 0.5–2 mm high, with a diameter of 3–30 mm and an average separation of 3–40 mm. The dimensions of these nubs are not critical, since they serve merely to maintain a free flow cross-section. If the spacers are located on the outside of the inner inliner, the outer inliner (preliner) can, in the simplest case, consist of a flexible sealing tube which is smooth on both sides.

The inner inliner, which forms an inherently rigid pipe after insertion into the outer inliner (preliner), can be formed by systems known in the art such as short-pipe relining, the U-liner method, soft lining, or insertion of a continuous, heated HDPE pipe, etc.

Preferably, however, a system with a total of (at least) three inliners is used. In this case, for example, after pulling in the outer inliner (preliner), a middle inliner is pulled into the preliner, whereby flat nubs serving as spacers are present on either the outside of the middle inliner or the inside of the preliner. However, the invention also comprises such embodiments in which the space between the middle and outer inliners, or between the inner and outer inliners, is formed by an additional layer such as a liquid-permeable fleece, etc.

In accordance with a preferred embodiment of the invention, an additional inliner is introduced into the middle inliner in a manner known per se, either by pulling or by the inversion method, whereby this inner inliner, in accordance with a first embodiment of the invention, has a resin-impregnated outer fleece layer in the inserted state. By injecting a fluid such as water or air, the inliner is then inflated or erected, and if necessary pressed against the sewer wall, whereby the resin layer hardens and, in conjunction with the inner inliner, forms an inherently rigid inner pipe. Alternatively, the (subsequent) inside of the middle inliner and the (subsequent) outside of the inner inliner can each have a resin-impregnated fleece, whereby the resin impregnations react with each other and harden, for example.

In accordance with another particularly preferred embodiment of the invention, the outside of the inner inliner has means such as nubs which serve not only to fix a defined separation (annular space) between the inner and middle inliners but also to provide a form-locking anchoring of the inner inliner in a hardenable mass, such as mortar, injected into the annular space between the inner and the second inliners. This embodiment of the invention is described in more detail in the following.

The inner tube-shaped thermoplastic inliner preferably has a wall thickness of 1.5 to 5 mm, whereby thicker walls can also be employed if the sewers being refurbished have a relatively large nominal diameter (for example, DN>1000 mm). Likewise, if the sewers being refurbished have small diameters (for example, DN 150 mm), thinner walls can be chosen.

The nubs on the outside of the inner tube-shaped thermoplastic inliner preferably have a diameter of 5 to 15 mm, a length of 8 to 20 mm, and a head diameter larger than that at the base, to achieve an undercut. This nub form is generally known. The separation of the individual nubs from each other is about 1.5 to 4 cm, so that there are about 500 to 5000 nubs per $m^2$.

The nubs serve on the one hand as spacers from the middle inliner, so that, following insertion of the inner inliner into the middle inliner, a annular space is reserved between the middle inliner and the inner inliner. The individual nubs then extend into this annular space. The annular space is completely filled with a hardenable mass such as a synthetic resin. The mass is then allowed to harden. A low-viscosity mortar (insulator) is preferred as the hardenable mass.

After completely filling and hardening of this annular space with mortar, for example, the nubs with their undercuts form at the same time anchoring elements which secure the inliner to the hardened mortar. The middle and inner inliners and the hardened mortar (insulator) thereby form a rigid (new) pipe, which is isolated from the outside by the middle inliner and lined on the inside with the inner inliner.

In the mortaring process, the annular space between the middle and inner inliners is completely filled with the low-viscosity mortar. If necessary, hardening of the mortar can be retarded or accelerated by tempering the fluid in the interior of the inliner. Through the use of a high-strength mortar, the filled annular space forms a load-bearing shell and thus simultaneously ensures the statics of the inliner. After only 12 hours hardening time, for a nominal diameter DN 800, all stress analyses required of self-supporting linings in accordance with IfBT ("Richtlinie für Auswahl und Anwendung von Innenauskleidungen mit Kunststoffbauteilen für Misch- und Schmutzwasserkanäle, Anforderungen und Prüfungen, 09.82") and ATV A 127 ("Richtlinie für die statische Berechnung um Entw asserungskanälen und Leitungen") are fulfilled.

If the refurbished pipeline is subject to particularly high mechanical stress (statics), two inner inliners with outside nubs can also be employed, whereby both resulting annular spaces are completely filled with mortar, for example.

To produce the tube-shaped nubbed inliners, a sheet of suitable thermoplastic plastic is formed into a tube in a manner known per se, whereby one side strip of, for example, 3 to 10 cm width, preferably about 4.5 cm width, is overlapped by the other, parallel side strip. In the overlap area, the side strips are thermally welded, preferably with a double weld. The inspection channel formed between the two welds serves in leakage testing of the welds. The weld thereby runs approximately parallel to the longitudinal axis of the inliner.

It is especially advantageous if, in the area of the double weld, there is at least one row of nubs between the two welds. The number of nubs (spacers and anchoring elements) per $m^2$ in the area of the weld should be about the same number as in the area of the remaining sheet. In this case, the nubs, possibly in offset rows, are arranged parallel to each other and to the longitudinal extension of the sheet, whereby a space of about 0.5 to 2 cm, wide enough for a weld, is reserved between each two adjacent nub rows. For larger diameters of pipes being refurbished, multiple nubbed sheets can be joined together as necessary to form an inliner of larger diameter.

In accordance with these methods, the inliners can, if necessary, in effect be tailored to various sewer diameters. The outer inliner (preliner) in this case has an outer circumference corresponding approximately to the inner circumference of the sewer being refurbished. Likewise, the middle inliner has an outer circumference corresponding approximately to the inner circumference of the outer inliner (preliner). The same applies to the inner inliner.

Even in the extremely improbable case that both the outer inliner (preliner) and the middle inliner are subsequently damaged and that water can thereby penetrate the mortar layer from outside, the relatively flexible inner inliner in this case is not pressed in, i.e., it does not indent, since the nubs are held by the hardened mortar. Depending on the nub geometry, outside pressures of up to 3 bar can be withstood before the nubs are drawn out of the pipe shell.

In the end, it is not significant in the present invention how the inherently rigid inner pipe is formed, as long as an open flow cross-section is reserved between it and the outer preliner to serve as an inspection space for detecting and eliminating leaks as required.

With the help of this free flow cross-section or inspection space, following the refurbishment or even thereafter, a leak can be detected using methods known per se such as applying pressure above or below atmospheric pressure, suction or collection with a thin inspection tube of liquids penetrating the inspection space, measurement of the electrical resistance using a test probe, etc. If necessary, a leak so located can also be sealed in a manner known per se by injecting a hardening and/or swelling means into the inspection annular space.

In accordance with a further preferred embodiment of the invention, a metal foil such as aluminum is imbedded in one of the employed inliners (outer inliner (preliner), middle inliner, inner inliner). This barrier foil serves as a reliable barrier against permeation or diffusion of chlorinated hydrocarbons, etc., which can penetrate the thermoplastic material of the inliners. The barrier foil is preferably integrated into the middle inliner.

In accordance with a preferred embodiment of the invention, a light-colored pigment is mixed with the plastic for the inner inliner to obtain a liner of light color. As a measure for the "lightness level" or "global reflectance," the so-called L value is determined from a dulled sample as per DIN 5033, Part 4 (spectral methods, light type C, 2° observation angle, geometry 0°/45°). An L value of 100 means that 100% of the incident light is (diffusely) reflected (ideal white). The inliner in accordance with the invention preferably exhibits a global reflectance of>30%, preferably>60% (L value>30 or>60, respectively). This significantly facilitates subsequent inspection of the refurbished sewer using a video camera.

In accordance with an alternative embodiment of the invention, no pigments or carbon black are mixed with the thermoplastic plastic for the inner inliner, resulting in a transparent or translucent inliner. As a measure for the "global light transmittance," that portion of the perpendicularly incident light (380–780 nm) penetrating the sample (including the scattered portion) is measured. The global light transmittance of the inliner in this embodiment of the invention is>30%, preferably>50%. This enables subsequent inspection of the mortar surrounding the inliner for the presence of relatively large cavities, air bubbles, or cracks, for example.

In general, the inliners according to the invention can, given sufficiently high flexibility, be inserted into the sewer section being refurbished by the so-called inversion method. Preferably, however, the inliners are pulled from a normally existing manhole(standard manhole structure) to the next existing manhole, whereby intermediate manholes can be also be bridged. For this purpose, the inliner can be folded approximately in a U or S shape and pulled loosely, including over relatively small bending radii.

Preferably, the prefabricated inliners are spandrel-braced on a reel at the manhole structure. By means of a deformation unit positioned over the entrance opening, the inliner is folded into an approximate U shape during the pulling procedure, resulting in a cross-section reduction of about 50% compared with the original state, with corresponding loss of rigidity. This enables the convenient use of an inserted PE pipe bend inside the manhole structure to redirect the inliner by 90° and insert it into the sewer pound. From the corresponding end manhole of the pound being refurbished, the individual inliners are then likewise pulled in by means of a redirection device.

It is particularly advantageous that the inliners do not have to be heated prior to being pulled into the sewer pipeline, i.e., that they can be pulled at the ambient temperature.

In the preferred embodiment of the invention, the outer inliner (preliner) is first pulled into the sewer being refurbished. If the outer liner (preliner) has nubs, these are positioned toward the inside. The middle inliner, if applicable with the nubs toward the outside, is then pulled into the outer inliner, and the inner inliner, with nubs on its outside, is then pulled into the middle inliner.

In this manner, a three-shell system of inliners is produced that clearly can be augmented if necessary with additional layers (inliners), as long as the attendant cross-section reduction is acceptable.

If possible, the welds in each case should be positioned in the crown area of the sewer pipe.

The relining system of the invention incorporates, in a previously unknown manner, such in part contradictory characteristics as:

high flexibility for simpler insertion of the inliner through existing manhole structures, high resistance to aggressive chemical media, absolute impermeability to exfiltration and infiltration, high inherent stability and mechanical strength, such as under mechanical stress from outside (earth movements) or subsequent high-pressure water jet cleaning from inside, long operational life, applicability even for pipelines which are not passable, applicability even for non-circular sewer cross-sections, pipe bends, etc., or heavily damaged sewers with water intrusion from the outside, low energy consumption and level of expenditure during laying, low loss of cross-section, protection against incrustation, favorable cost, capability for leakage inspection, and capability for refurbishment.

The invention will be described in more detail on the basis of an embodiment and the drawings.

BEST MODE FOR CARRYING OUT THE INVENTION

Figure 1:
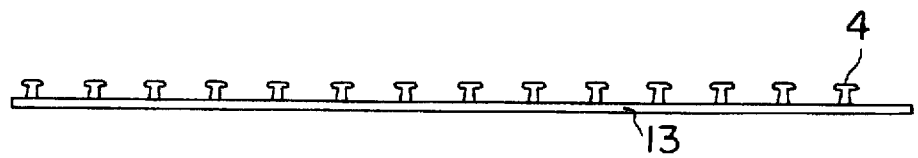
FIG. 1 shows a nubbed sheet for fabricating the inner inliner.
Figure 2:
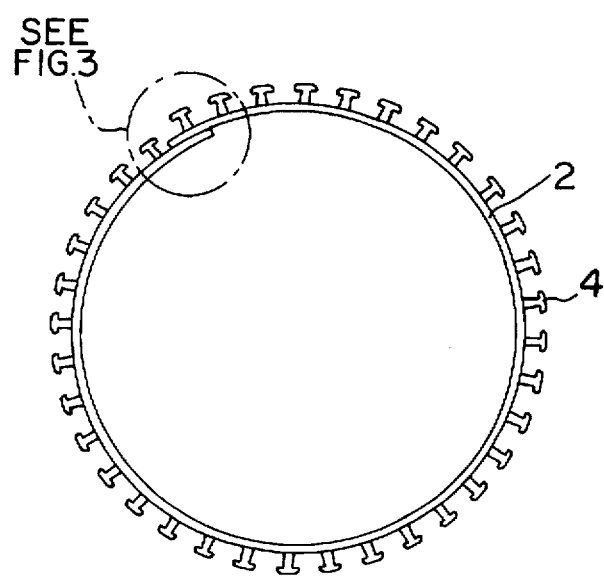
FIG. 2 shows the inner inliner following welding.
Figure 3:
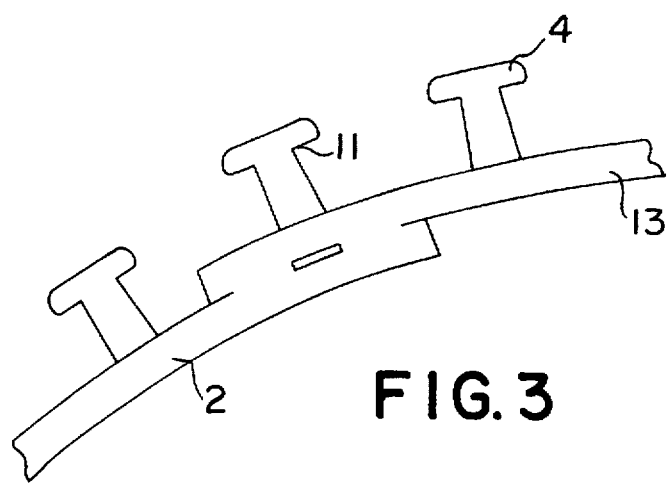
FIG. 3 shows detail X of FIG. 2 (weld)
Figure 4:
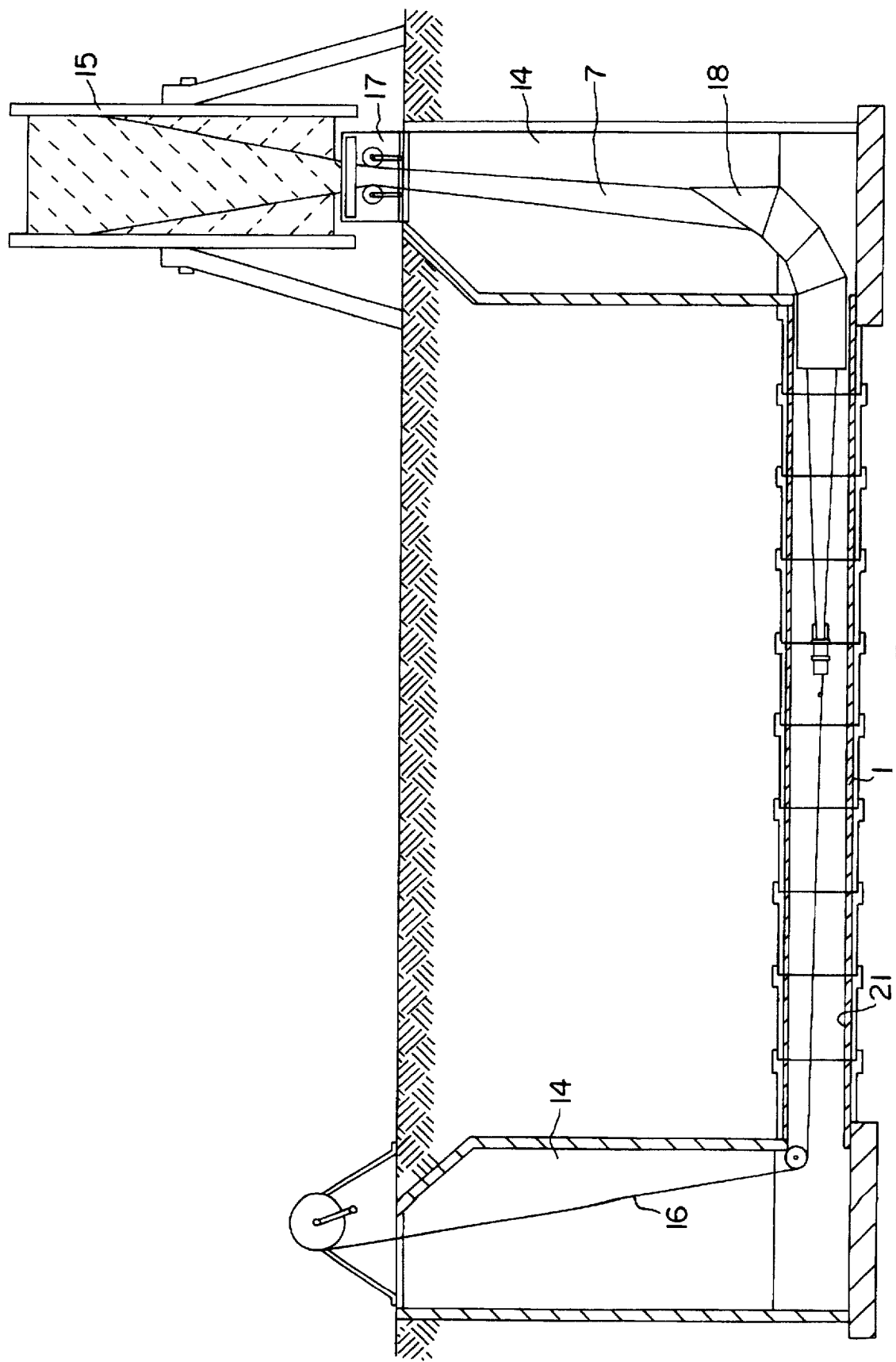
FIG. 4 shows a longitudinal section of a sewer being refurbished, while pulling in the preliner.

A sewer 1 with nominal diameter of 300 mm (DN 300) is to be refurbished. Sewer 1 has standard manhole structures 14 spaced every 60 m (FIG. 4).

To produce the preliner 7, a preparation consisting of

97% by weight HDPE (Vestolen® A 3512 Natur; Hüls AG; modulus of elasticity 590 N/mm$^2$)

2% by weight (white pigment PMM 869, Polyplast M üller)

1% by weight HDPE (Vestolen® A 3512 R, Hüls AG; containing carbon black)

is homogenized in a single-screw extruder known to those skilled in the art and extruded onto a rolling mill as a flat foil with a width of about 1 m and an average thickness of 2.5 mm. The rolling mill consists of a first roll with flat round depressions and a second, smooth roll. In the gap between the rolls, the thermoplastic material is pressed into the flat depressions. Removing the sheet from the roll yields a sealing sheet with nubs 8 with a height of 1 mm and a diameter of 8 mm. After trimming the sheet on both sides to a width of 985 mm, the sheet is formed in a second work step into the preliner 7 with an outer diameter of 300 mm, whereby a double weld with an intervening inspection channel is created in the overlap area by thermal welding.

For the middle inliner 3, a three-layer HDPE sealing sheet with sandwiched aluminum foil 10 is employed as a permeation barrier. Welding to the middle inliner 3 is accomplished as for the outer inliner (preliner 7).

To produce the inner inliner 2, pure HDPE (Vestolen® A 3512 Natur; Hüls AG; modulus of elasticity: 590 N/mm$^2$) is used.

This preparation is homogenized in a single-screw extruder and extruded onto a rolling mill comprising a first roll with slightly conical holes and a second roll. In the gap between the rolls, the thermoplastic material is pressed into the slightly conical holes. Removal of the sheet from the roll yields a sealing sheet 13 with nubs. The nubs, with an initial length of 13 mm, are then compressed at the head using a second rolling mill comprising a steel roll and a rubber roll, with a gap width of 12 mm, so that the individual nubs 4, compressed to a length of 10 mm, have corresponding undercuts 11. In the embodiment shown, the sealing sheet 13 is 3 mm thick. The nubs 4 have a length of 10 mm and a diameter at the base of 5 mm and at the head of 8 mm.

The translucent (opaque) inner inliner 2 has a global light transmittance of 53%.

Preliner 7, middle liner 3, and inner liner 2 are each cut to a length of 60 m, inspected for leaks, and transported to the site on a cable reel. In FIG. 4, pulling the preliner 7 into the sewer 1 being refurbished is shown in more detail. The preliner 7 is pulled into sewer 1 from the standard manhole structure 14. Using apparatus 15, the preliner 7 is first folded into an approximate U shape and, by means of the cable 16, fed into the sewer 1 via the roller guide 17 and the redirection device 18.

Figure 5:
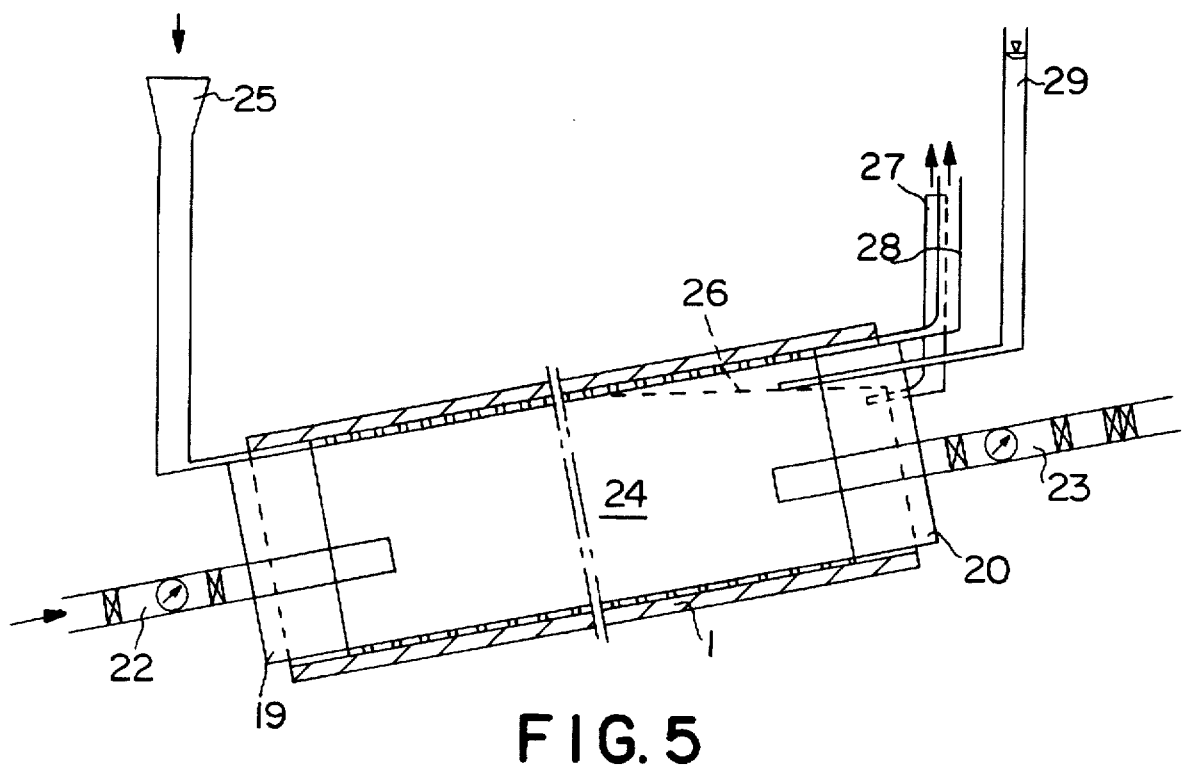
FIG. 5 shows a longitudinal section through a sewer being refurbished, during filling of the annular space (schematic)

After pulling in the preliner 7, the middle inliner 3 and the inner inliner 2 are pulled into the preliner 7 in the same manner (FIG. 4). Subsequently, at both ends of the inner inliner 2, the nubs 4 are removed for a length of 10 cm. These nub-free ends 31 of the inliner 2 are pressed on both ends against the sewer interior wall 21 using cutoff bags 19 and 20 and sealed off in this area (FIG. 5). Fill openings 22 and outlet openings 23 allow the filling and removal of (possibly tempered) water 24 under defined pressure. At the same time, any leakage can be detected in time by testing for a drop in pressure. By virtue of the water-related interior pressure of about 0.5 bar, the inner inliner 2 is pressed against the middle inliner 3, which is pressed against preliner 7, which is pressed against the inner wall 21 of sewer 1, whereby the nubs 4 fix a defined annular space 5 between the sealing sheet 13 and the middle inliner 7. A low-viscosity mortar 6 (brand name HC/HT Relining Injector, Hüls Troisdorf AG) is injected into this annular space 5 via the filling funnel 25. In the example shown, the mortar 6 is injected at low pressure from the crown of the lowest point of the sewer pound, whereby the mortar 6 is accordingly distributed by gravity within the annular space 5 of the slightly inclining sewer 1. In FIG. 5, the current mortar level 26 is depicted. Air can escape as necessary from the annular space 5 through ventilation ducts 27 and 28, and at the same time the current mortar level 26 can be monitored. When injecting the mortar 6, the interior pressure in the inner inliner 2 can increase under certain conditions; this can be monitored and compensated for using overflow 29.

After mortar injection is complete, the mortar 6 hardens within about 7 hours, whereby the hardening time can be accelerated or retarded by tempering the water 24.

After hardening, the mortar 6 forms a rigid, self-supporting pipe 12 that is reliably protected from corrosion from the inside by the inner inliner 2 and from the outside by the middle inliner 3. The nubs 4 provide anchoring of the nubbed sheet in the mortar pipe (FIG. 7).

Figure 9:
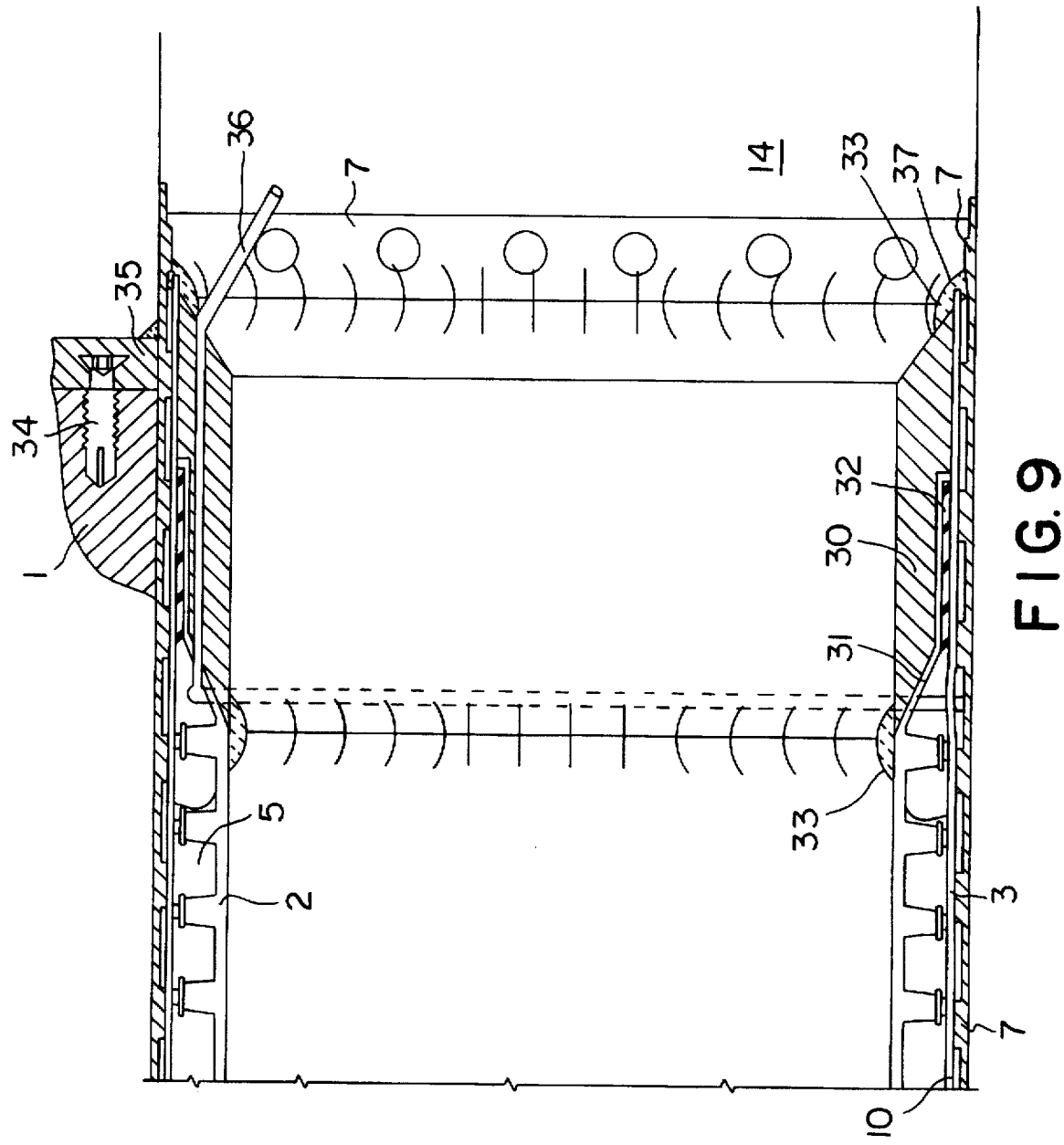
FIG. 9 shows the attachment of the inliner at the end of the sewer.

Finally, as shown in FIG. 9, the inliner 2 is attached at both ends to the manhole structures 14. For this purpose, a statically self-supporting, rigid HDPE ring 30 is inserted from the manhole structures 14 into the end of the sewer, whereby the nub-free ends 31 of the inliner 2, together with the end of the middle inliner 2 and the end of the preliner 7, are clamped between the HDPE ring 30 and the sewer inner wall 21. Furthermore, an inspection tube 36 provides access to the inspection space 9 between the outer inliner 7 and the middle inliner 3. As shown in FIG. 9, the middle inliner 3 is additionally welded to the outer inliner 7 at the inliner end, i.e., at the manhole structure 14 (weld 37). A sealing band 32 of butyl rubber (double-sided adhesive band) serves as a further seal between the inliner ends 31 and the middle inliner 3. After insertion of the HDPE rings 30, the latter are welded to the inliner 2 (weld 33). Finally, a semicircular-arc-shaped HDPE plate 35, fastened from the manhole structure 14 at the upper half of sewer pipe 1 with dowels 34, is welded to ring 30.

The use of a nearly transparent inliner 2 permits reliable TV monitoring of the annular space 5, filled with mortar 6, so that, for example, large air bubbles can be detected in time.

Figure 7:
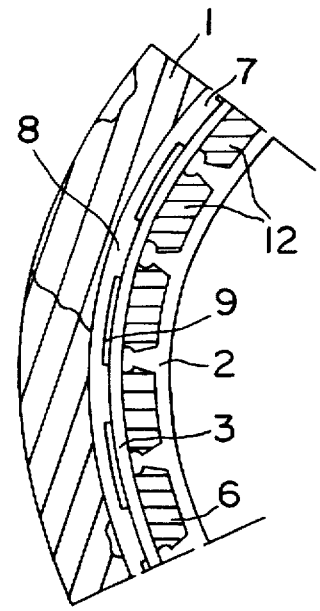
FIG. 7 shows a cross-section through the refurbished sewer (detail Y of FIG. 8 after the annular space filling)
Figure 8:
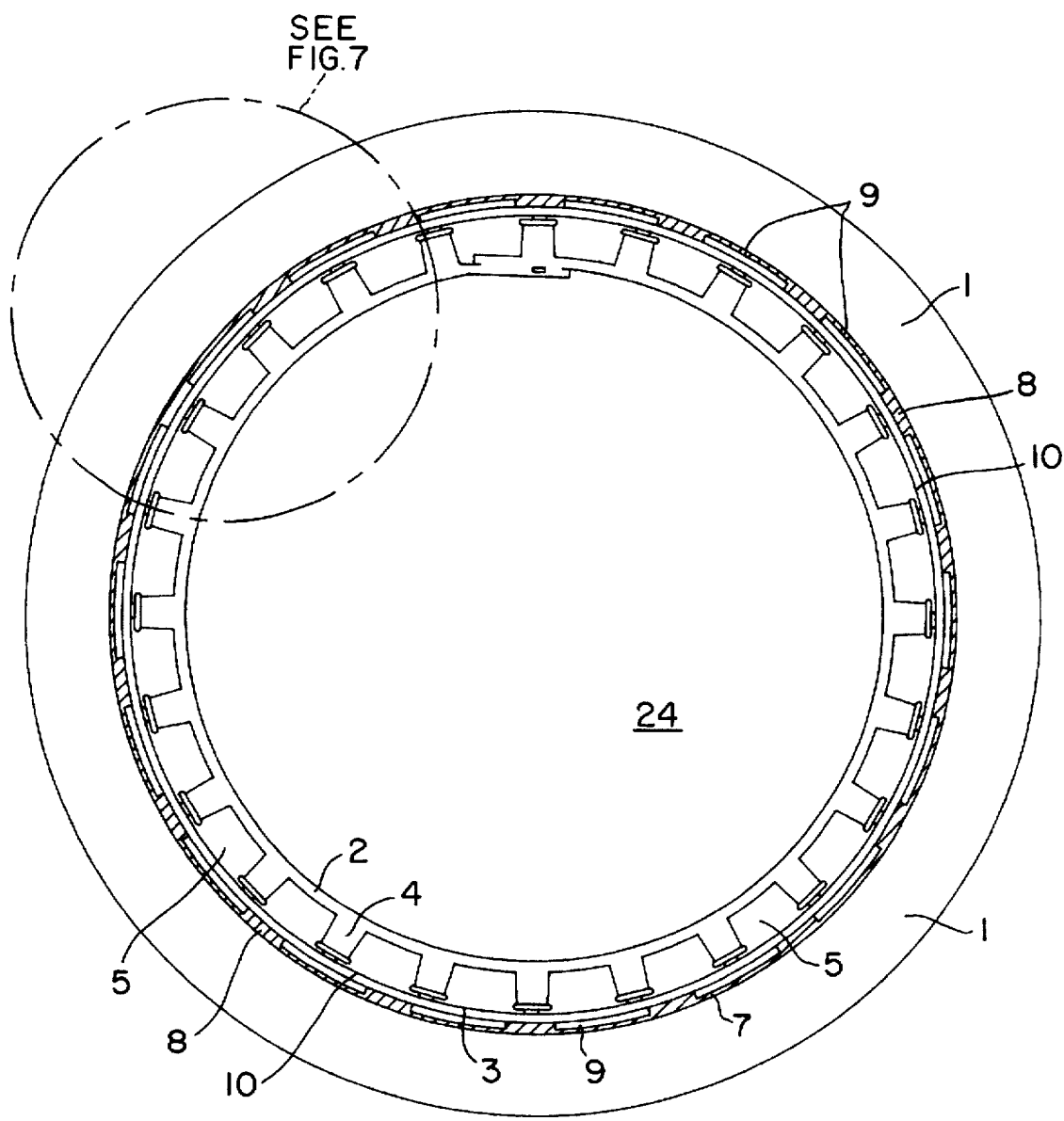
FIG. 8 shows a cross-section through the sewer being refurbished, before the annular space filling.

In FIGS. 8 and 7, a cross section of an accordingly refurbished pipe is shown. Between the outer inliner (preliner 7) and the middle inliner 3, an inspection space 9 (outer annular space) is fixed by the nubs 8.

Figure 6:
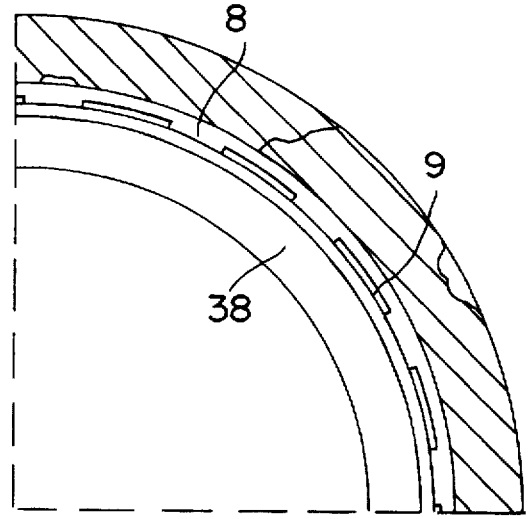
FIG. 6 shows a cross-section through a refurbished sewer (alternative embodiment)

FIG. 6 depicts an alternative embodiment of the invention in which the inner pipe 38 is formed from a resin-impregnated flexible fleece tube.

LEGEND

1 Sewer pipeline, sewer
2 Inner thermoplastic inliner
3 Middle inliner
4 Nubs
5 Annular space
6 Mortar
7 Outer inliner (preliner)
8 Nubs
9 Annular space, inspection space
10 Metal foil
11 Undercuts
12 Inherently rigid inner pipe
13 Sealing sheet
14 Manhole structure
15 Apparatus
16 Cable
17 Roller guide
18 Redirection device
19 Cutoff bag
20 Cutoff bag
21 Sewer interior wall
22 Fill opening
23 Outlet opening
24 Water
25 Filling funnel
26 Mortar level
27 Ventilation duct
28 Ventilation duct
29 Overflow
30 Ring
31 Nub-free inliner end
32 Seal
33 Weld
34 Dowel
35 HDPE plate 36 Inspection tube
37 Weld
38 Inner pipe

I claim:

1. A system for relining a transport line with an inner inliner and an outer inliner,
   whereby the inner inliner forms an inherently rigid inner tube after insertion into the outer inliner, and
   whereby the outer inliner is spaced from the inner inliner such that an open flow cross-section is formed between the inner and outer inliners to serve as an inspection space suitable for detecting and repairing leaks in the inliners.

2. The system of claim 1, wherein the spacing between the outer inliner and the inner inliner is fixed by nubs on the inside of the outer inliner or the outside of the inner inliner.

3. The system of claim 1, wherein the transport line is a sewer pipeline.

4. The system of claim 1, wherein the material of the inner inliner contains a light-colored pigment so that the inner inliner is of a light color.

5. The system of claim 1, wherein the inner inliner is of a transparent or translucent material.

6. A system for relining a transport line with an inner inliner, a middle inliner, and an outer inliner,
   whereby the inner inliner, or the inner inliner in conjunction with the middle inliner, forms an inherently rigid inner pipe after insertion into the outer inliner, and
   whereby the outer inliner is spaced from the middle inliner such that an open flow cross-section is formed between the middle and outer inliners to serve as an inspection space suitable for detecting and repairing leaks in the inliners.

7. The system of claim 6, wherein the spacing between the outer inliner and the middle inliner is fixed by nubs on the inside of the outer inliner or the outside of the middle inliner.

8. The system of claim 6, wherein the transport line is a sewer pipeline.

9. The system of claim 6, wherein the material of the inner inliner contains a light-colored pigment so that the inner inliner is of a light color.

10. The system of claim 6, wherein the inner inliner is of a transparent or translucent material.

11. A method for relining a transport line with an inner inliner and an outer inliner, comprising:
    providing the outer inliner in the transport line in connection with the inner diameter of the transport line,
    providing the inner inliner within the outer inliner such that an open flow cross-section is formed between the inner and outer inliner to serve as an inspection space suitable for detecting and repairing leaks in the inliners and such that the inner inliner forms an inherently rigid inner pipe after insertion into the outer inliner.

12. The method of claim 11, wherein the inner inliner consists of thermoplastic plastic and is softened by heating before or after being provided within the outer inliner.

13. The method of claim 11, wherein one of the inliners contains a metal foil as a diffusion or permeation barrier to chlorinated hydrocarbons.

14. The method of claim 11, wherein the transport line is a sewer pipeline.

15. The method of claim 14, wherein the inliners are successively pulled into the sewer pipeline via existing manhole structures.

16. A method for relining a transport line with an inner inliner, a middle inliner and an outer inliner, comprising:
    providing the outer inliner in the transport line in connection with the inner diameter of the transport line,
    providing the middle inliner within the outer inliner such that an open flow cross-section is formed between the middle and outer inliner to serve as an inspection space suitable for detecting and repairing leaks in the inliners, and
    providing the inner inliner within the middle inliner such that the inner inliner, or the inner inliner in conjunction with the middle inliner, forms an inherently rigid inner pipe after insertion into the outer inliner.

17. The method of claim 16, wherein the inner inliner is a flexible tube, the outside of which has a fleece with a hardenable resin, and the resin is allowed to harden after being provided within the middle inliner.

18. The method of claim 16, wherein the outside of the inner inliner has means for fixing an annular spacing between the middle and inner inliners, and wherein after provision of the inner inliner within the middle inliner a hardenable medium is inserted into this annular spacing and allowed to harden.

19. The method of claim 16, wherein one of the inliners contains a metal foil as a diffusion or permeation barrier to chlorinated hydrocarbons.

20. The method of claim 16, wherein the transport line is a sewer pipeline.

21. The method of claim 20, wherein the inliners are successively pulled into the sewer pipeline via existing manhole structures.

* * * * *